United States Patent [19]

Hawkins

[11] 4,244,560
[45] Jan. 13, 1981

[54] TREE PULLER

[76] Inventor: Wallace H. Hawkins, Rt. 7, Old Buncombe Rd., Greenville, S.C. 29609

[21] Appl. No.: 5,097

[22] Filed: Jan. 22, 1979

[51] Int. Cl.³ .............................................. A01G 23/06
[52] U.S. Cl. .................................................. 254/132
[58] Field of Search ................ 37/2 R, 2 P; 254/132; 144/34 R, 34 A, 34 B, 2 N

[56] References Cited

U.S. PATENT DOCUMENTS

| | | | |
|---|---|---|---|
| 2,302,801 | 11/1942 | Powelson | 37/2 R |
| 2,491,058 | 12/1949 | Peacock et al. | 37/2 R |
| 2,535,099 | 12/1950 | Slick | 37/2 X |
| 2,650,063 | 8/1953 | Hawkins | 37/2 R X |
| 2,854,213 | 9/1958 | Hawkins | 37/2 R X |
| 3,110,477 | 11/1963 | Campbell | 37/2 R X |
| 3,116,048 | 12/1963 | Irwin et al. | 37/2 R X |
| 3,243,904 | 4/1966 | Perry | 37/2 R |
| 3,802,663 | 4/1974 | Widegren et al. | 37/2 R X |
| 4,067,369 | 1/1978 | Harmon | 37/2 R X |

FOREIGN PATENT DOCUMENTS 458308  9/1973  U.S.S.R. ..................................... 37/2 P

*Primary Examiner*—E. H. Eickholt
*Attorney, Agent, or Firm*—Bailey, Dority & Flint

[57] ABSTRACT

A tree harvester or remover is illustrated having a gripper including a V-shaped wedging member with a blade projecting inwardly thereof for cutting into a portion of the tree above the roots forming a shelf with adjacent fibers of the tree compressed between the wedging members, and means for exerting an upward force on the gripper by exerting a compressive force between ground engaging support members and an elevatable frame from which the gripper depends.

10 Claims, 8 Drawing Figures

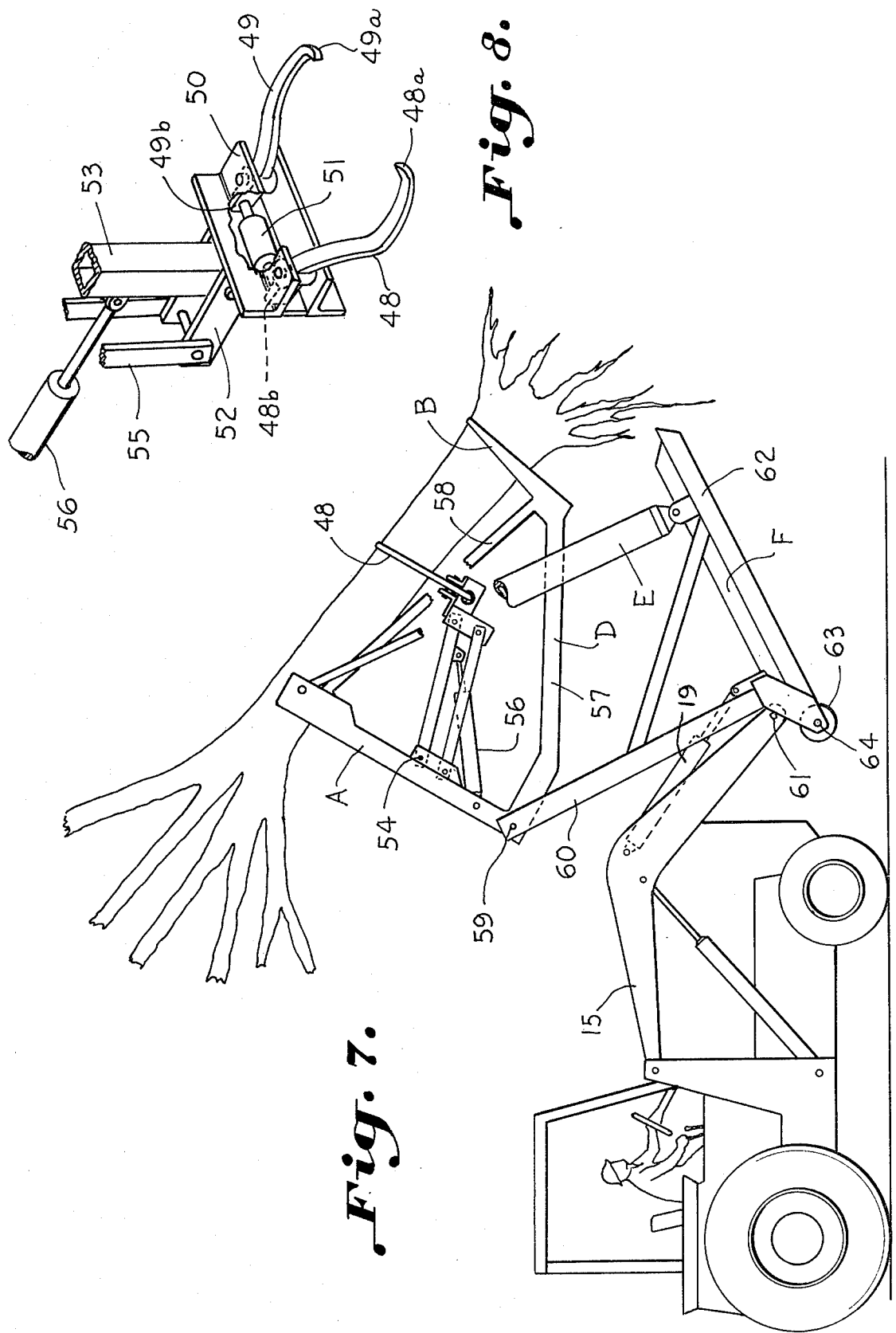

TREE PULLER

BACKGROUND OF THE INVENTION

When harvesting trees as in a timber or pulp wood operation, the trees are cut by sawing or shearing, leaving stumps, or else the entire tree is pushed over using a bulldozer and the like. The equipment for carrying out such operations is expensive and the ground is left full of stumps, or torn up to such an extent that replanting operations are hindered thereby.

Tree pulling devices have been tried heretofore, but the difficulty has been primarily in getting a grip on the tree which will not slip when exerting the considerable force necessary to uproot the tree from the ground. Further difficulty is encountered in carrying away a tree once it has been pulled up, roots and all. U.S. Pat. No. 2,618,871 illustrates a stump lifter which employs a blade for severing underground roots and then exerting a lifting force. Such apparatus is incapable of pulling and carrying away an entire tree, and the blade is used for severing the roots rather than obtaining a grip upon the tree to permit uprooting of the tree.

A tree puller is illustrated in U.S. Pat. No. 3,989,075 wherein the entire tree is extracted by gripping the trunk and cutting the roots all around prior to exerting a lifting force upon the tree.

It is an important object of this invention to provide an inexpensive attachment which may be utilized upon any desirable working vehicle, preferably a front end loader or the like, for uprooting and carrying away an entire tree.

Another important object of the invention is to provide an attachment for a working vehicle which is capable of carrying out tree harvesting operations or tree removal operations, such as the removal of old trees from an orchard so as not to disrupt the ground or leave stumps, roots and limbs which would impede a replanting operation.

Another important object of the invention is to provide an apparatus capable of achieving an effective grip upon the trunk of the tree just above the top roots sufficient to permit operations to uproot the entire tree. The grip exerted by devices constructed in accordance with the present invention permits the tree after being pulled to pivot backwardly to facilitate removal of the tree from the area, yet maintains a shelf-like grip in the adjacent compressed wood which avoids stripping of the outside fibers of the tree causing slippage with consequent loss of gripping force.

Another important object of the present invention is to provide a maneuverable device for utilization in pulling trees so as to facilitate a selective cutting operation where minimal damage to adjacent trees is required.

BRIEF DESCRIPTION OF THE INVENTION

It has been found that a tree pulling device may be provided utilizing a gripper which is essentially V-shaped and which has thickened wedging surfaces with a blade carried thereby projecting inwardly of the V for entering the tree creating a ledge support in the area of compressed wood fibers which have been compressed by the wedging members. A support is provided for pivotal attachment to a working vehicle which is also elevatable and which support carries the gripper for being raised by a force exerted between the pivoted or tiltable support and the gripper.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 7 is a side elevation with the support frame in raised position carrying a tree comparable to FIG. 5, showing a modified form of the invention, and FIG. 8 is a perspective view illustrating a tree holding mechanism adapted to embrace the tree above the point at which it is gripped by the extracting means, constructed in accordance with a modified form of the invention.

DESCRIPTION OF A PREFERRED EMBODIMENT

Figure 1:
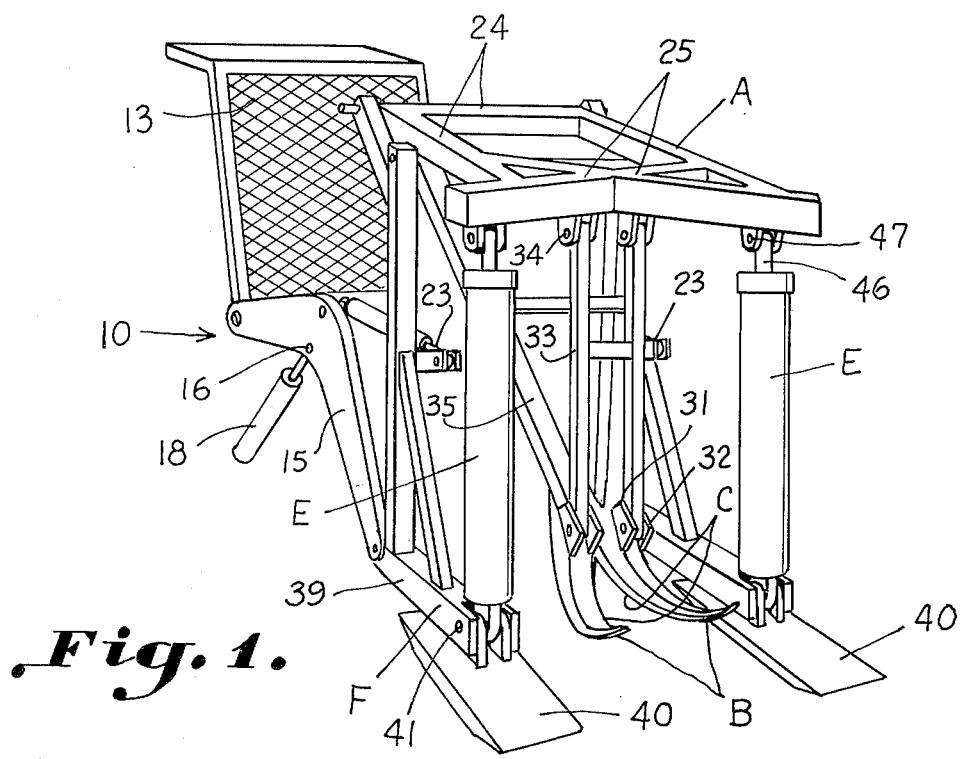
FIG. 1 is a perspective view illustrating a gripping member, and an elevatable frame carried upon a front end loader upon a main support frame carried in the position normally occupied by the dirt pan and being tiltable by the fluid operated cylinders which normally control the dirt pan.

The drawings illustrate a tree pulling apparatus for attachment to a working vehicle constructed in accordance with the invention. An elevatable member A is carried by the vehicle. A pair of elongated outwardly diverging thickened wedging members B are integrally joined at adjacent ends thereof. A sharpened blade member C extends inwardly along the wedging members and is carried in fixed relation thereto. A ledge is formed by the blade members penetrating into the trunk of the tree forming a complementary ledge in the tree to an extent limited by engagement of inner surfaces of the wedging members with the fibers of the tree trunk. Mounting means D attach the wedging members and the blade members carried thereby, to the elevatable member. Means in the form of a pair of spaced cylinders E forcefully raise the elevatable members by exerting a force between the elevatable frame member A and a tiltable ground engaging frame F upon which the elevatable frame member is mounted.

The front end loader, broadly designated at 10 in the drawings, may be in the form of any suitable working vehicle. The chassis is illustrated at 11 and this is supported by wheels 12. A cab is provided for an operator which includes a front shield member 13 which may be of expanded metal which is adequately braced as at 14 to protect the operator, and yet permit the driver to see therethrough for carrying out the tree pulling operation.

The usual transversely spaced arms 15 are pivoted on the chassis and extend forwardly and downwardly therefrom, while an intermediate portion has pivotal connection as at 16 to the piston rod 17 of a cylinder 18. The usual transversely spaced pair of cylinders 19 have pivotal connection to the arms as at 20. The piston rod 21 carried by the piston 19 is pivotally connected as at 22 upon a pair of spaced fixed frame members 23.

Figure 2:
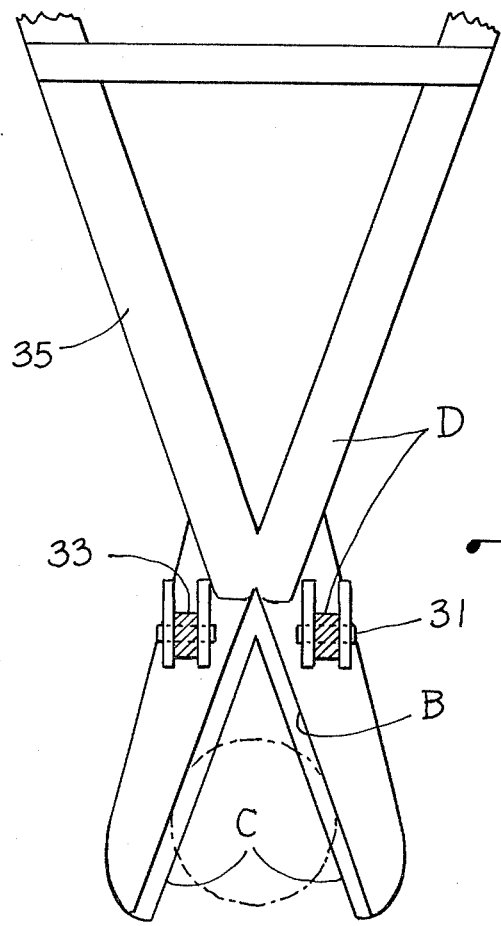
FIG. 2 is an enlarged plan view of a gripping element and attachment means constructed in accordance with the present invention.
Figure 3:
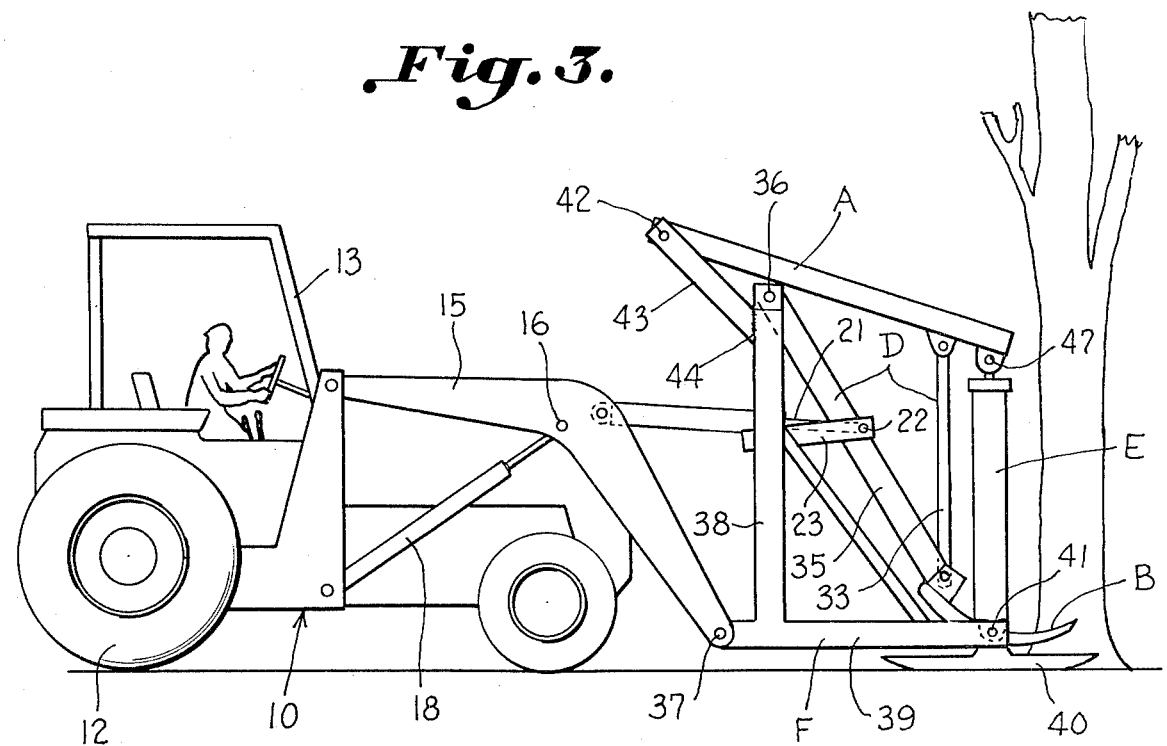
FIG. 3 is a side elevation further illustrating a tree pulling attachment constructed in accordance with the present invention carried by a front end loader preparatory to a tree pulling operation.
Figure 4:
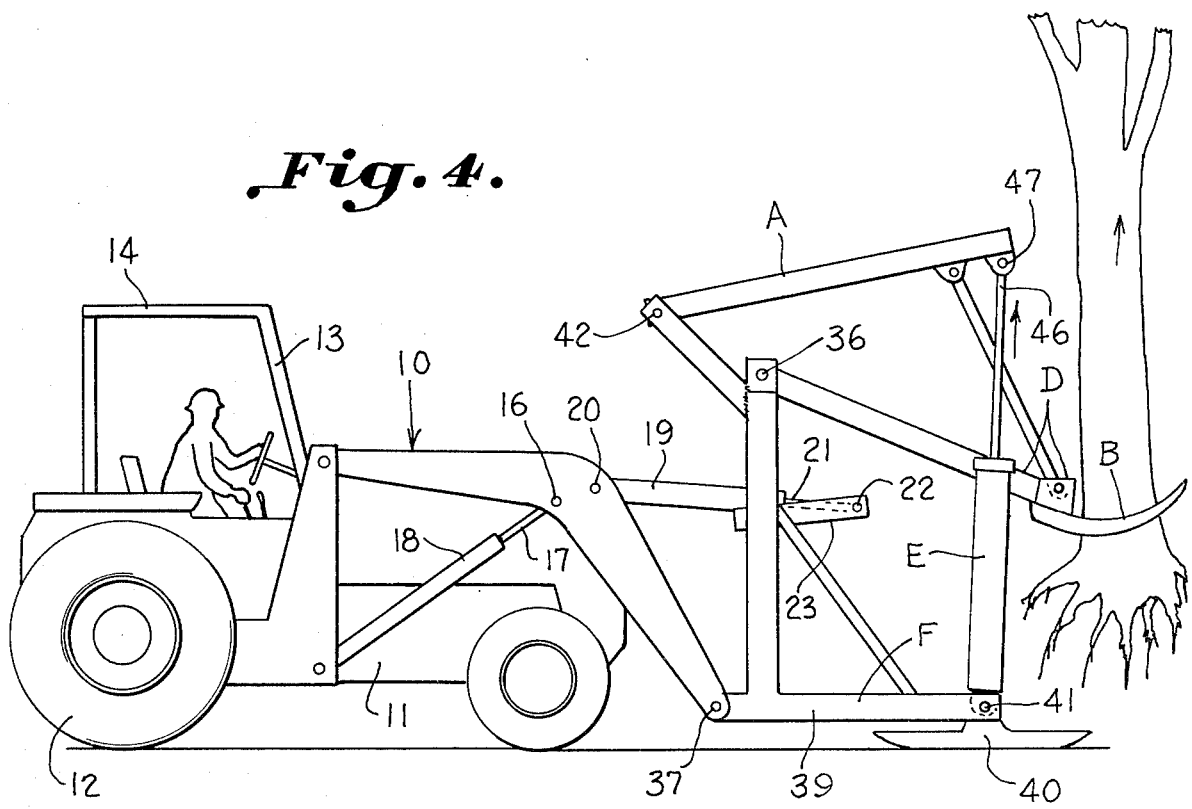
FIG. 4 is a side elevation similar to FIG. 3 with the elevatable frame raised so as to pull the tree, roots and all from the ground.
Figure 6:
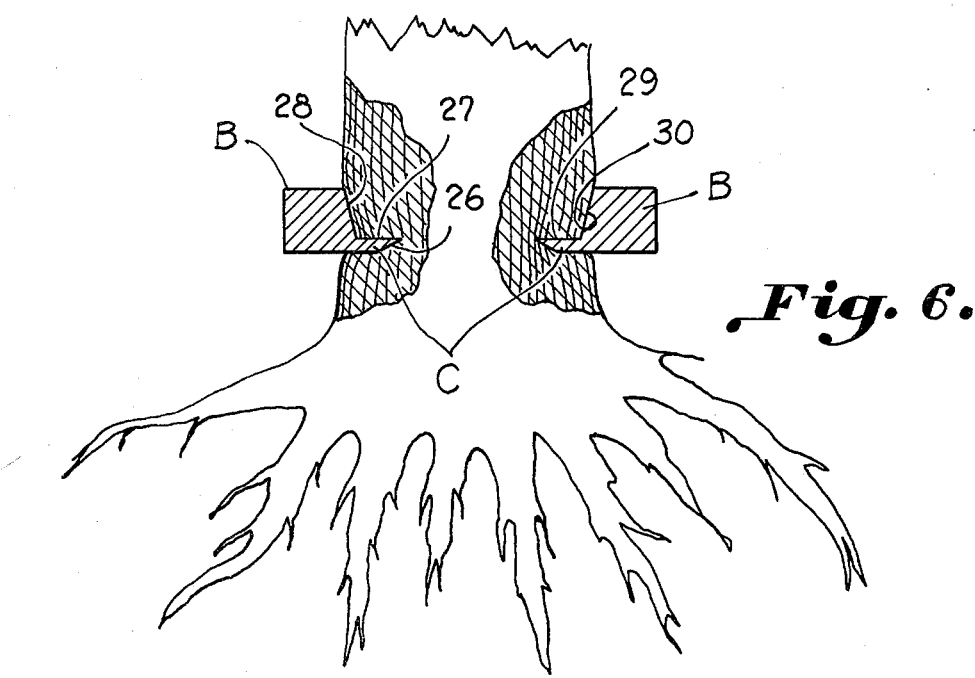
FIG. 6 is a transverse, sectional, elevation taken on the line 6—6 in FIG. 5 illustrating the ledge grip afforded by the V-shaped gripping member when in engagement with the tree with adjacent fibers in compression by the wedging action exerted by the thickened wedging members.

The elevatable member A is provided in the form of a frame member having substantially rectangular frame supports 24 which define at the front, an outwardly extending diverging member 25 forming a notch or V-shaped portion for receiving a portion of the trunk of the tree above the V-shaped gripper. The elevatable frame member A carries the V-shaped gripping member which includes the outwardly diverging thickened wedging member B. Mounting means are provided for attaching the gripping means B in depending relation and such are illustrated at D. The inwardly projecting blade C is best illustrated in FIGS. 2 and 6 and includes a sharpened edge 26 and flat blade portion 27 which is integrally secured to the thickened wedging members B, affording an upwardly extending wedging surface 28. As illustrated, the blades C are carried at a lower portion of the wedging members B, but it is believed that they may be positioned in an intermediate portion if desired so long as the ledge 29 is formed thereby in adjacent compressed portions 30 of the tree.

The mounting means D includes pivotal connection as at 31, upon spaced mounting plates 32 for attachment to the upright linkage 33 which has pivotal connection as at 34 with a forward portion of the elevatable frame member A. The mounting means D is further illustrated as including a compressive support frame portion 35 which has spaced pivotal connections 36 upon the tiltable ground engaging frame attachment F. As best observed in FIG. 5, when the frame A is raised the gripper swings upwardly and outwardly in an arcuate path causing the tree to swing rearwardly pivoting about the gripping point to rest in the notch formed by the member 25 above the support exerted by the gripper.

The attachment frame F is pivotally carried as at 37 upon the free end of the arms 15, and includes upright transversely spaced frame members 38 and lower forwardly extending frame members 39 carried to form a substantially L-shaped frame. The L-shaped frame F engages the ground through shoes 40 which have medial pivotal connection as at 41 to the free end of the frame member 39. The shoes 40, preferably have upwardly tapering ends 40a for facilitating movement thereof along the ground preparatory to engagement of the tree and actuation of the spaced cylinders E which forcefully raise the elevatable frame A by exerting a force between an end portion thereof and the tiltable frame F. It should be noted at this point, that the frame F has pivotal connection adjacent a rear end portion thereof as at 42, upon a frame member 43 which is a rearward extension of the L-shaped attachment frame F, being secured thereto by welding as at 44. It should be noted further that the wedging members B and the complementary inwardly extending blades C are arcuate and taper upwardly from the area of pivotal attachment at 31 toward a free end as illustrated at 45.

Figure 5:
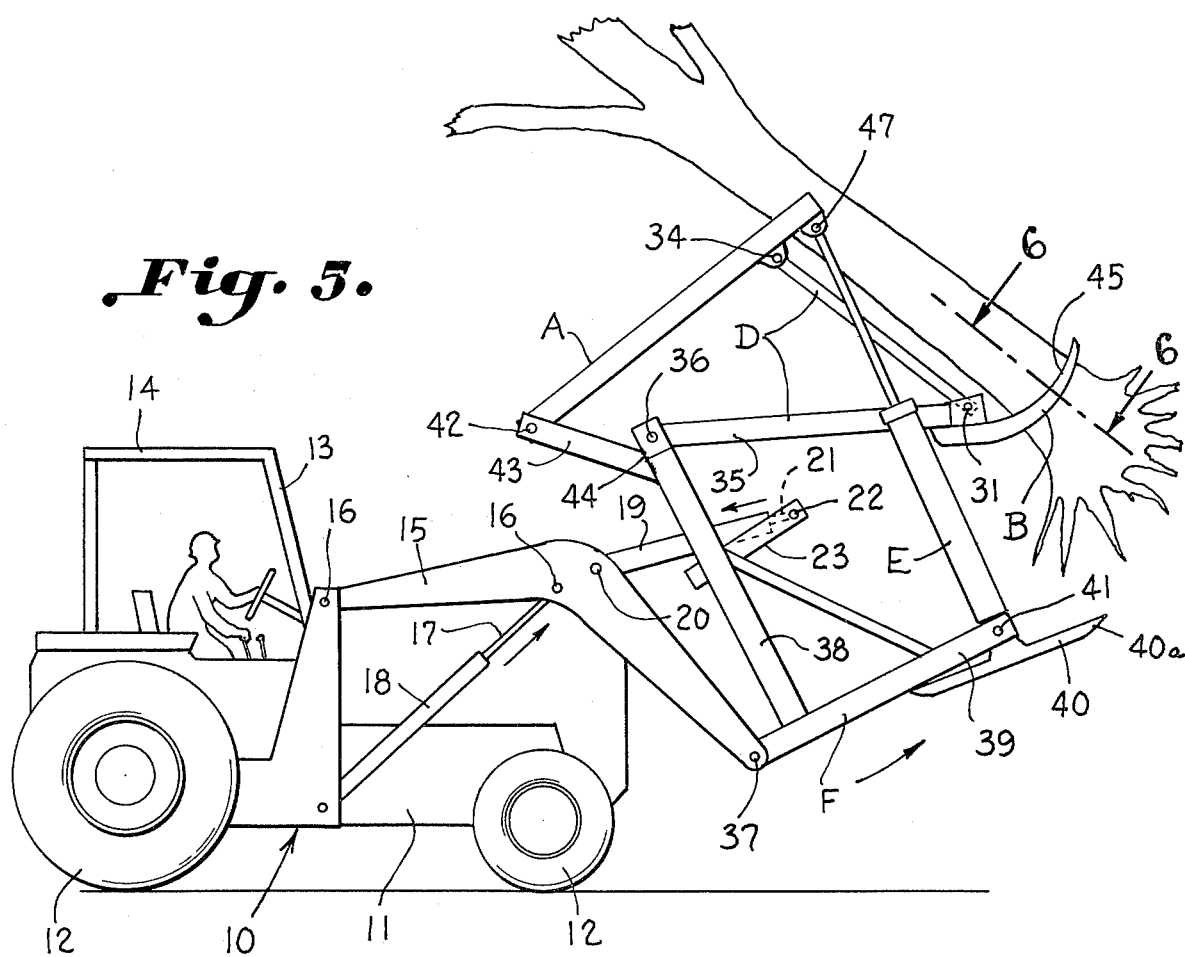
FIG. 5 is a side elevation similar to FIGS. 3 and 4 with the support frame in tilted position so that the upper portion of the tree pivots rearwardly so as to be supported in a tree supporting portion spaced above the V-shaped gripper element with the support frame also elevated for removing the entire tree from the area.

FIG. 7 illustrates a modified form of the invention including additions and improvements. On occasion, difficulties have been encountered with handling the tree after it is pulled back over the tractor such as illustrated in FIG. 5. While transporting over particularly rough terrain the tree sometimes backs out of the puller head and becomes uncontrolled requiring a time-consuming operation of regaining control and later freeing the tree for disposition as the delivery to the desired location.

A holding mechanism or grabber has been constructed which includes a pair of opposed arms 48 and 49. The arms are grooved so as to encompass the tree and they afford inwardly directed hook-like members 48a and 49a and their ends to retain the trunk of the tree within their grasp.

The arms are pivotally carried on a mounting bracket 50 and opposed ends of the arms 48b and 49b are provided with suitable pivotal connection to a double-acting cylinder 51 carried by the mounting bracket 50. The mounting bracket has a bifurcated, rearwardly extending support 52 which pivotally receives a link 53 which, in turn, has pivotal connection as at 54 (FIG. 7) to the lifting frame or elevatable member A. A second parallel link 55, spaced rearwardly of the link 53 has similar pivotal connection to provide a controlled positive movement for the gripper means. A cylinder 56 has pivotal connection with the linkage means and with the frame A so as to control the forward and rearward movement of the gripper means.

It will be noted that the wedging members B are straight in FIG. 7 rather than curved and have rigid connection by fixed linkage members 57 and 58 which have rigid connection with the wedging members, as well as the lifting frame A. The cylinders E have pivotal connection with the frame A and with the ground engaging frame F. The lifting frame A and the rigidly carried wedging member B have pivotal connection as at 59 with a standard 60 which, together with the ground engaging frame F froms a supporting frame. The mounting means D, in this case supplied by the rigidly connected linkage members 57 and 58. The lifting frame has pivotal connection as at 61 with the arm 15 of the vehicle. The ground engaging frame has an enlarged foot or runner 62, and in order to facilitate removal of the lifting device and vehicle over rough ground from which the tree has been removed, a bridging roller 63 is rotatably mounted as at 64 on a portion of the supporting frame adjacent the vehicle. The roller is horizontally disposed transversely across the frame which bridges uneven portions of the ground when extracating the supporting frame carrying the tree from uneven terrain.

Spaced cylinders E include piston rods 46 which have pivotal connection as at 47 the forward portions of the frame members A. It should be observed in FIG. 1, that the tree may be cradled when in the position shown in FIG. 5 in the diverging notch formed by the members 25.

It is thus seen that a gripping member has been provided for engaging a tree in such a fashion that stripping of the tree will not occur when a lifting action is exerted thereon. This is accomplished by formation of a ledge within the adjacent compressed tree fibers gripped by the wedging surface 28 formed by the wedging members B. It is also important to note that a substantially vertical lifting force may be effectively exerted by forceful engagement of the attachment or tiltable frame F with the ground permitting the fluid operated cylinders E to exert a force between the elevatable frame A and the ground. The tiltable support frame may be elevated after the gripper has been raised and the support frame tilted by raising the usual forwardly extending arms of a front end loader.

The tree pullers hereof may, of course, be utilized to pull stumps as well as trees because the gripper may be set very low to the ground. Rather than remove the tree from the area after being pulled, the felled tree may be cut up with the stump being utilized for wood puly or other processing. In any case, a greater length of the tree may be utilized. Since the stumps are removed, site preparation is greatly facilitated whether the land is to be utilized for replanting in trees or as farm land.

While a preferred embodiment of the invention has been described using specific terms, such description is for illustrative purposes only and it is to be understood that changes and variations may be made without departing from the spirit or scope of the following claims.

What is claimed is:

1. A tree pulling apparatus carried by a wheeled vehicle comprising:
    an elongated arm pivotally carried by the vehicle on one end thereof and extending forwardly and downwardly therefrom;
    first fluid power operated cylinder means connected to said elongated arm intermediate the ends thereof for raising and lowering same;
    a tiltable supporting frame having a lower inner end pivotally carried upon a free end of said elongated arm and a lower forward end supportable upon the ground;
    second fluid power operated cylinder means pivotally connected to said tiltable frame for imparting tilting movement thereto;
    an elevatable frame member having pivotal connection adjacent an upper rearward portion of said tiltable frame;
    tree gripping means carried by said elevatable frame extending forwardly thereof; and
    a pair of transversely aligned power operated cylinders, having pivotal mounting between a forward lower end of said tiltable frame and forward portion of said elevatable frame member, and being spaced on each side of said tree gripping means.

2. the structure set forth in claim 1 wherein said tree gripping means includes outwardly diverging tree engaging members, linkage means having pivoted connection adjacent said tree gripping means and said elevatable frame, and support means fixed to said gripping means having pivotal connection adjacent an upper rear portion of said tiltable frame;
    whereby said gripping means moves outwardly, upwardly to engage said tree and in an arc as said elevatable frame is pivotal upwardly.

3. The structure set forth in claim 1 or 2 including a trunk supporting member carried by a forward portion of the tree when said elevatable frame is raised.

4. The structure set forth in claim 3 wherein inwardly extending opposed blade members are integrally carried by said diverging tree engaging members.

5. The structure set forth in claim 3 including a pair of horizontal ground engaging shoes having pivotal intermediate support adjacent said lower forward end of said tiltable frame.

6. A tree pulling apparatus carried by a vehicle comprising:
    a supporting frame member carried adjacent a forward end of said vehicle;
    said frame having an upright member and a lower member extending forwardly from said upright member in fixed relation thereto;
    an elevatable frame member having a pivotal connection adjacent an upper portion of said upright member above said lower member extending forwardly therefrom;
    tree gripping means depending from a forward portion of said elevatable frame member;
    ground engaging means carried by a forward portion of said lower forwardly extending member; and
    power operated means exerting a force between said ground engaging means and a forward end of said elevatable frame member.

7. The structure set forth in claim 6 wherein said tree gripping means include diverging wedging members carrying opposed blade members extending inwardly thereof, and wherein said power operated means includes a pair of cylinders spaced transversely on each side of a tree being pulled.

8. The structure set forth in claim 7 including a holding mechanism carried by said elevatable frame for engaging the tree above said tree gripping means.

9. The structure set forth in claim 8 wherein said holding mechanism includes a pair of opposed arms movable inwardly and outwardly for embracing the tree, and a power operated frame carrying said opposed arms on one end and pivoted on the other to said elevatable frame.

10. The structure set forth in claim 7 including an elongated roller extending transversely across said supporting frame adjacent a lower portion thereof adjacent said vehicle.

* * * * *